United States Patent
Khijniak et al.

(10) Patent No.: US 7,805,728 B2
(45) Date of Patent: Sep. 28, 2010

(54) BROWSER ELEMENTS FOR COMMUNICATING WITH OTHER BROWSER ELEMENTS AND WITH EXTERNAL APPLICATIONS

(75) Inventors: Pavel Khijniak, Redmond, WA (US); Henrik Frystyk Nielsen, Hunts Point, WA (US)

(73) Assignee: Microsoft Corporation, Redmond, WA (US)

( * ) Notice: Subject to any disclaimer, the term of this patent is extended or adjusted under 35 U.S.C. 154(b) by 865 days.

(21) Appl. No.: 11/687,429

(22) Filed: Mar. 16, 2007

(65) Prior Publication Data
US 2008/0229331 A1 Sep. 18, 2008

(51) Int. Cl.
*G06F 13/00* (2006.01)
(52) U.S. Cl. .................. 719/313; 719/328; 719/331; 715/700; 715/762
(58) Field of Classification Search .......... 719/313, 719/328, 331; 715/700, 762
See application file for complete search history.

(56) References Cited

U.S. PATENT DOCUMENTS

| | | | |
|---|---|---|---|
| 6,289,382 B1 | 9/2001 | Bowman-Amuah | |
| 6,496,203 B1 | 12/2002 | Beaumont et al. | |
| 6,961,945 B2 | 11/2005 | Stall | |
| 7,086,006 B2 | 8/2006 | Subramanian et al. | |
| 7,707,318 B2 * | 4/2010 | Heller et al. | 709/248 |
| 2003/0025732 A1 | 2/2003 | Prichard | |
| 2003/0184584 A1 | 10/2003 | Vachuska et al. | |
| 2004/0243944 A1* | 12/2004 | Sabiers et al. | 715/853 |
| 2005/0144226 A1 | 6/2005 | Purewal | |
| 2006/0053411 A1 | 3/2006 | Takamiya | |
| 2006/0064674 A1 | 3/2006 | Olson et al. | |
| 2006/0212836 A1 | 9/2006 | Khushraj et al. | |
| 2006/0259870 A1 | 11/2006 | Hewitt et al. | |

OTHER PUBLICATIONS

Henricksen, et al., "Infrastructure for Pervasive Computing: Challenges", Proc. of the Informatik 2001: Workshop on Pervasive Computing, Vienna, Sep. 2001, pp. 214-222.
Brown, et al., "Using Service-Oriented Architecture and Component-Based Development to Build Web Service Applications"—A Rational Software White Paper, Nov. 20, 2003. Rational Software Corporation. pp. 1-16.
Taylor, et al."A Component- and Message-Based Architectural Style for GUI Software", IEEE Transactions on Software Engineering, vol. 22, No. 6, Jun. 1996, pp. 390-406.

* cited by examiner

*Primary Examiner*—Andy Ho

(57) ABSTRACT

Techniques for configuring direct communicating between browser elements running in a browser and for direct communication between a browser element and an external application are described. Browser elements communicate with each other by referencing unique identifiers associated with the browser elements. External applications communicate directly with browser elements by referencing unique identifiers associated with the browser elements.

Browser elements are configurable as web services and communicate using various communication architectures and protocols. Application programming interfaces associated with browser elements configured as web services are accessible to web browsers through web scripting modules.

20 Claims, 4 Drawing Sheets

BROWSER ELEMENTS FOR COMMUNICATING WITH OTHER BROWSER ELEMENTS AND WITH EXTERNAL APPLICATIONS

BACKGROUND

Web browsers have evolved over the years, from web browsers that were typically used to view static web pages to dynamic web pages and web applications that have browser elements that can be configured for animation, audio, video, high resolution images, web scripts, applications, etc. However, one problem that exists with current browsers is that browser elements running in web browsers are unable to directly communicate with each other and this can hinder browser functionality. Further, external applications are unable to initiate direct communication with browser elements running in web browsers. As a result, development of web applications utilizing communication with browser elements is limited.

SUMMARY

The following presents a simplified summary of the disclosure to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are various techniques for configuring browser elements running in browsers to communicate with each other and/or external applications. A browser element is configured as a web service and application programming interfaces associated with the browser element can be accessed by other browser elements or by external applications. In at least one implementation, such configuring includes providing each browser element with a communicator module and assigning each browser element a unique identifier that is directly addressable by other browser elements and/or external applications. A browser element that has a communicator module may initiate communication with another browser element having a communicator module by referencing the unique identifier associated with the other browser element. Similarly, an external application may initiate communication with a browser element having a communicator module by referencing the unique identifier of the other browser element.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

Overview

The detailed description provided below describes techniques for communicating between browser elements and between a browser element and an external application. One or more browser elements are executed in a browser and may be displayed by a user interface of the browser. A browser element is configured as a web service so that it can receive data from a local web service running on a local client computing device running the browser as well as receive data from a an external web service running on one or more external web servers.

The web service contains one or more application programming interfaces that can be accessed by a web script via a web scripting module included in the browser. The web scripting module supports one or more web scripting languages capable of accessing the application programming interface through a web script.

The browser element is also configured to include a communicator module, which supports one or more communication architectures and one or more communication protocols.

The browser element is assigned a unique identifier. The unique identifier is directly addressable by other browser elements and/or external applications. Accordingly, a different browser element or an external application can initiate communication with the browser element by referencing the corresponding unique identifier.

Figure 1:
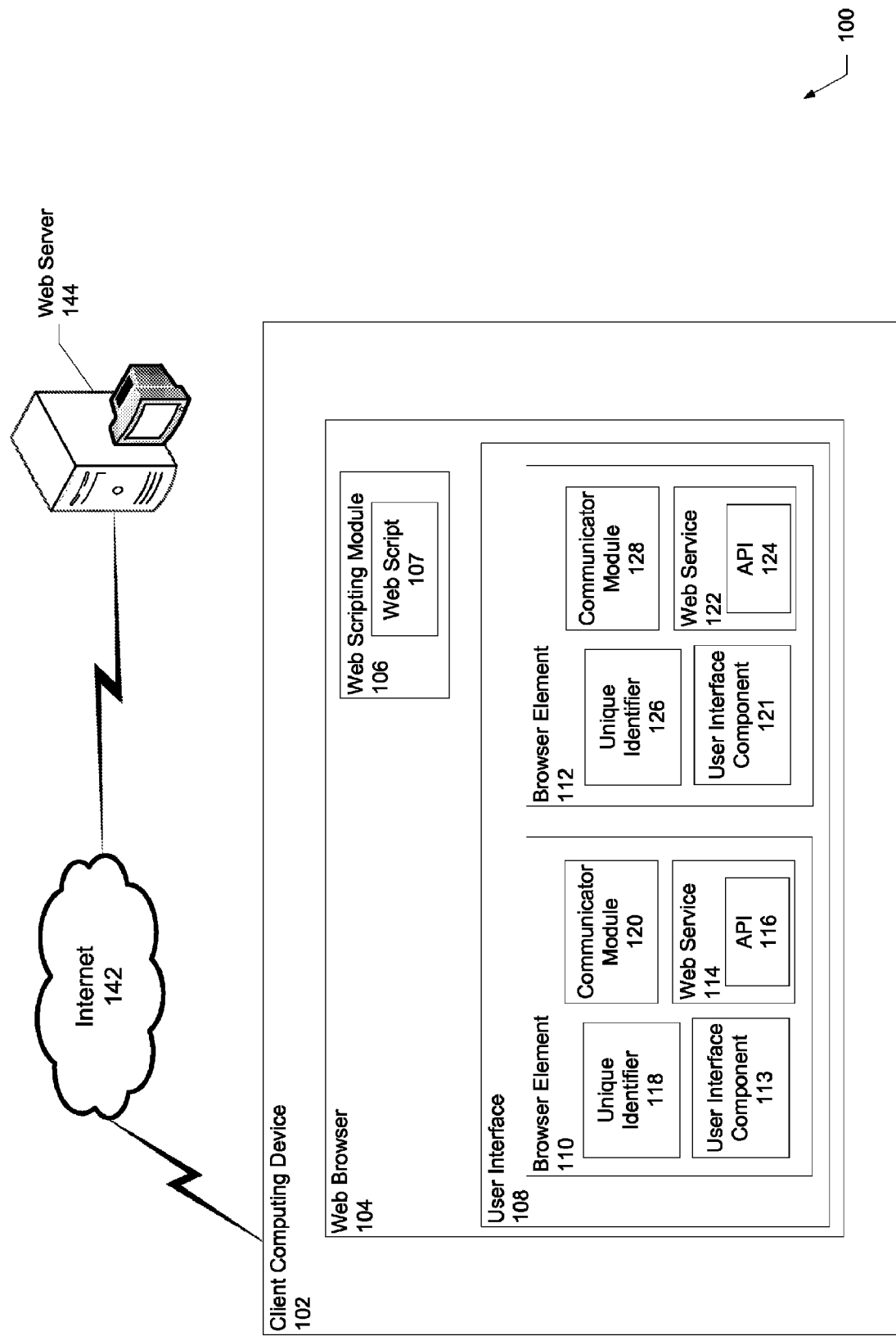
FIG. 1 illustrates an exemplary system for communicating between browser elements running in a browser.

FIG. 1 depicts an exemplary system 100 for enabling communication between browser elements running in a browser. The exemplary system includes a client computing device 102 running a browser 104. The client computing device 102 is operatively connected to the Internet 142 that is operatively connected to a web server 144. The browser 104 includes a web scripting module 106 and a user interface 108. The web scripting module 106 includes one or more web scripts 107. A first browser element 110 and a second browser element 112 execute in the browser 104 and are displayed by the user interface 108.

The first browser element 110 includes a user interface component 113. The user interface component 113 is configurable to determine how the first browser element 110 is displayed in the user interface 108. It is noted that the user interface component 113 may also be configured for additional purposes for web design using one or more programming languages supported by the browser 104.

The first browser element 110 is configured as a web service 114. The web service 114 includes an API (Application Programming Interface) set 116. The API set 116 includes one or more application programming interfaces 116. The API set 116 is extensible and may include a variety of functions and/or methods for execution. The first browser element 110 also includes a unique identifier 118. The unique identifier 118 may be an internet protocol address, a combination of numbers and letters, a uniform resource identifier, and the like.

The first browser element 110 also includes a communicator module 120, which can be a dynamic link library, a runtime library, and the like. The communicator module 120 supports one or more communication architectures and one or more communication protocols. It is noted that although the communicator module 120 is shown as being separate from the web service 114, the communicator module 120 may be included in the web service 114.

The second browser element 112 includes a user interface component 121. The user interface component 121 is configurable to determine how the second browser element 112 is displayed in the user interface 108. It is noted that the user interface component 121 may also be configured for additional purposes for web design using one or more programming languages supported by the browser 104.

The second browser element 112 is configured as a web service 122. The web service 122 includes an API (Application Programming Interface) set 124. The API set 124 is extensible and may include a variety of functions and/or methods for execution. The second browser element 112 also includes a unique identifier 126. The unique identifier 126 may be an internet protocol address, a combination of numbers and letters, and the like. It is noted that the unique identifier 118 and the unique identifier 126 are different.

The second browser element 112 also includes a communicator module 128, which can be a dynamic link library, a runtime library, and the like. The communicator module 128 supports one or more communication architectures and one or more communication protocols. It is noted that although the communicator module 128 is shown as being separate from the web service 122, the communicator module 128 may be included in the web service 122.

It is noted that the communicator modules 120, 128 support at least one common communication architecture and at least one common communication protocol if direct communication between browser elements is desired. For example, one communication architecture supported by the communicator modules 120, 128 is a client/server architecture. One example of a communication protocol supported by the communicator modules 120, 128 is TCP/IP.

In at least one implementation, the second browser element 112 is configured to initiate communication with the first browser element 110. The second browser element 112 initiates the communication by referencing the unique identifier 118 of the first browser element 110 in a request to communicate. The first browser element 110 receives the request to communicate from the second browser element 112 and thereafter may respond to the request immediately, respond to the request at a later time, process the request or ignore the request.

The communicator modules 120, 128 are configurable to determine how the respective browser elements 110, 112 initiate communication requests. The communicator modules 120, 128 are also configurable to determine how the respective browser elements 110, 112 initiate communication requests.

In the presently described example, the communication architecture supported is client/server and the communication protocol is TCP/IP. The second browser element 112 acts as a client and the first browser element 110 acts as a server. The communicator modules 120, 128 of the respective browser elements 110, 112 communicate using TCP/IP. The unique identifier of each browser element 110, 112 is a unique IP address.

It is noted that the communicator module 120 may be a component of the web service 114. It is also noted that communication between the first browser element 110 and the second browser element 112 can be initiated by either browser element and that each browser element 110, 112 may act as a client or as a server. Various communication protocols may be implemented to enable communication between the first browser element 110 and the second browser element 112. It is also noted that such communication is not limited to two browser elements and may support a plurality of browser elements.

In at least one implementation, a user of the web browser 104 is able to initiate communication to the first browser element 110 from the second browser element 112 as described above. For example, the user interface component 121 of the second browser element 112 may include a command prompt interface (not shown) into which the user types commands corresponding to instructions for the first browser element 110. The command prompt interface executes the web script 107 to access the API set 124 of the second browser element 112 that communicates the commands to the second browser element 112. The second browser element 112 receives the commands and operates accordingly.

Figure 2:
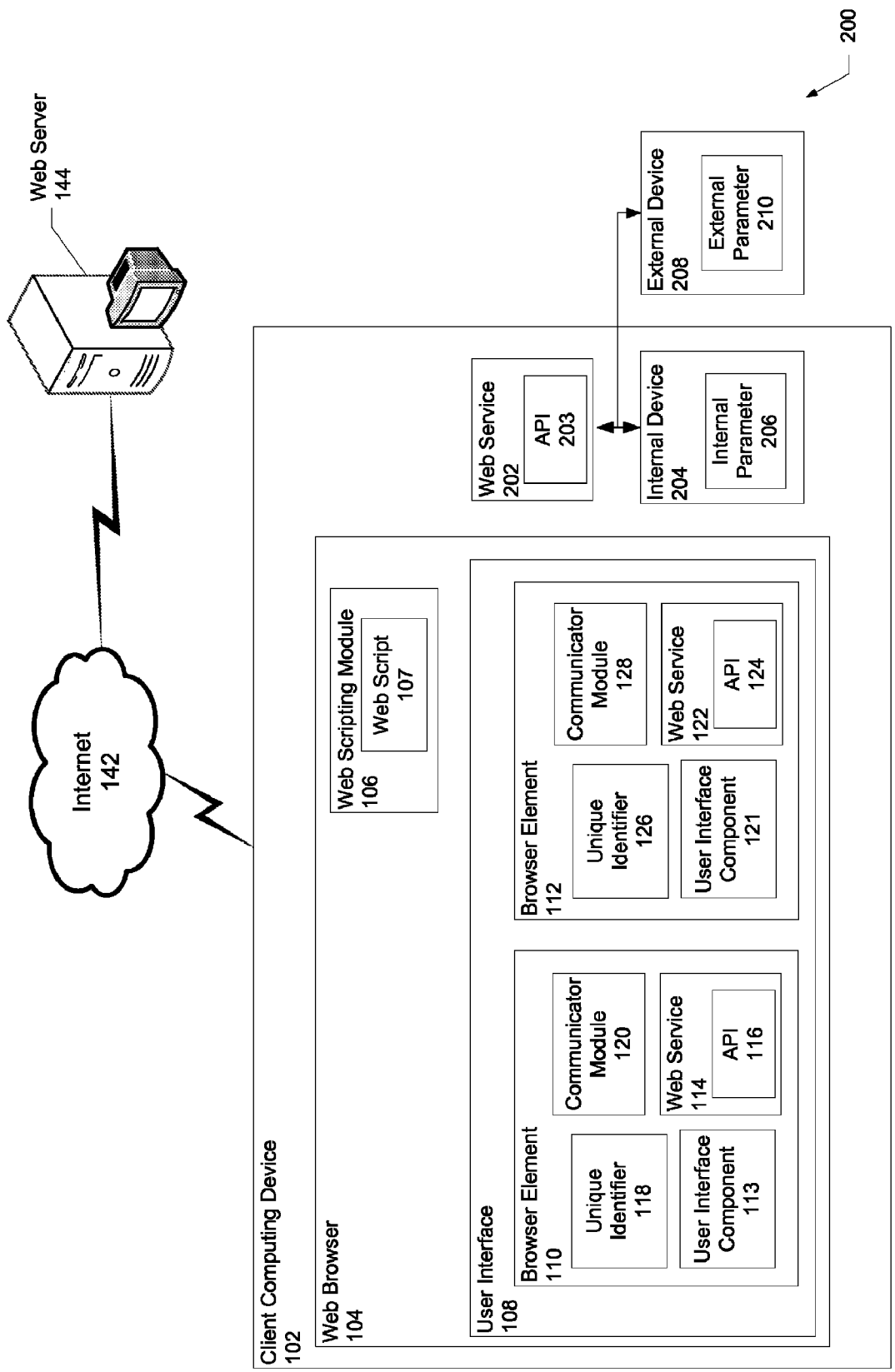
FIG. 2 illustrates an exemplary system for communicating between browser elements running in a browser and a local web service.

FIG. 2 depicts an exemplary system 200 for communicating between a browser element running in a browser and a local web service. In the following description, continuing reference is made to one or more elements shown in FIG. 1, and the same reference numerals used in association with these elements in FIG. 1 are also used in FIG. 2.

The client computing device 102 executes a local web service 202 that includes at least one application programming interface 203. Either of the browser elements 110, 112 may access the local web service 202. The local web service 202 monitors at least one internal parameter 206 of an internal device 204, which can be a computer processor, random access memory, computer thermometer, computer clock, a configurable device, and the like. The internal device 204 may be configured through the local web service 202.

The internal parameter 206 is measurable or quantifiable data associated with the internal device 204. For example, if the internal device is a computer processor of a computing device, an internal parameter associated with the computer processor may be usage of the computer processor in real-time. The local web service 202 is able to monitor, record, and provide access to the internal parameter 206.

The local web service 202 also monitors at least one external parameter 210 of an external device 208, which can be a coffee maker, a television, a garage door opener, a robot, a separate computing device, and the like. The external device 208 may be connected to the client computing device 102 wirelessly or wired. For example, a robot may be connected to the client computing device 102 wirelessly using a Bluetooth® wireless connection mechanism (not shown).

The external parameter 210 is measurable or quantifiable data associated with the external device 208. For example, if the external device is a television that is connected to the client computing device 102 using Bluetooth, then an external parameter associated with the television may be an indication of whether or not the television is powered on. The local web service 202 is able to monitor, record, and provide access to the external parameter. The external device 208 may be configured through the local web service 202.

Figure 3:
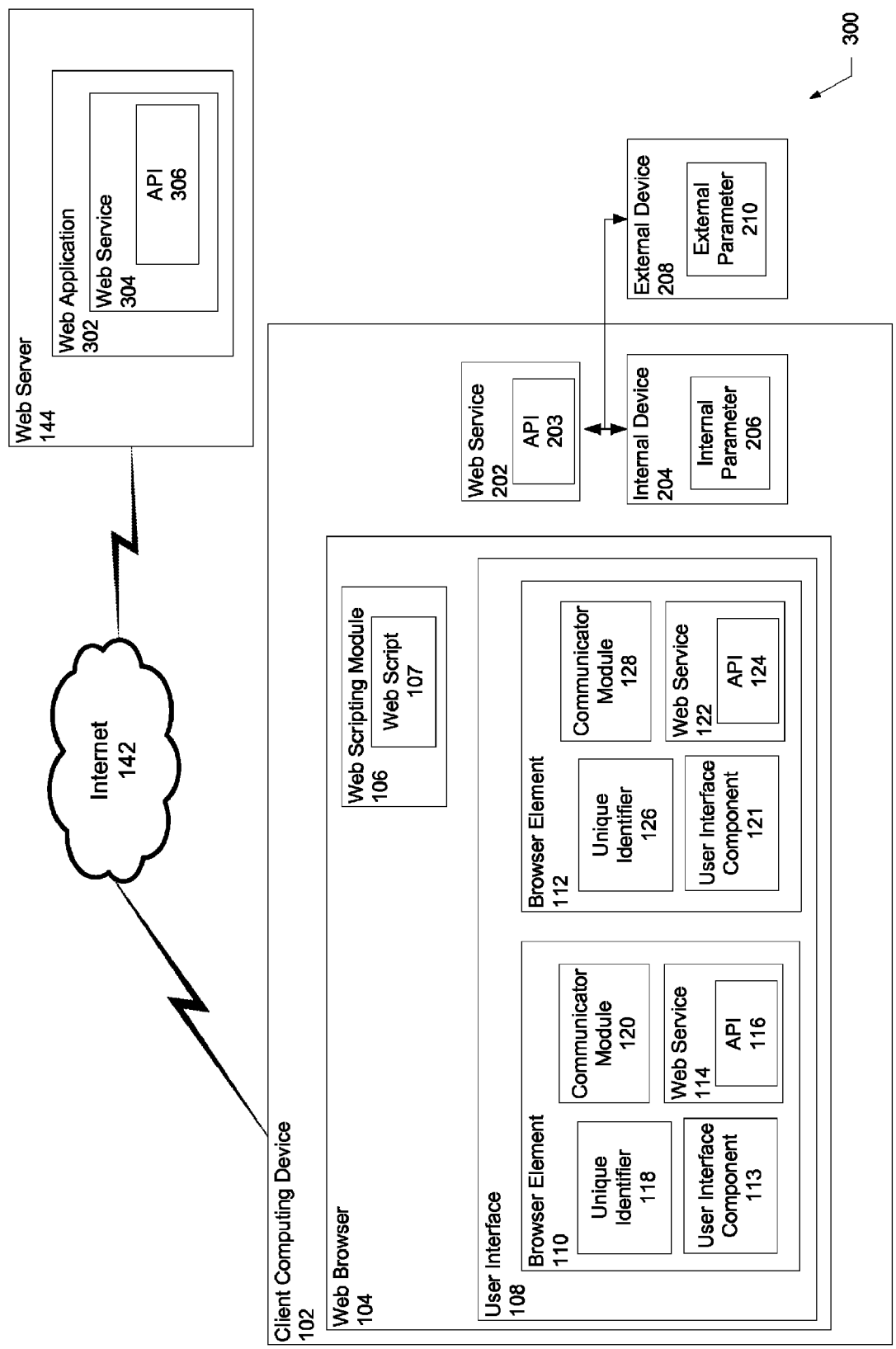
FIG. 3 illustrates an exemplary system for communicating between browser elements running in a browser and an external application.

FIG. 3 depicts an exemplary system 300 for communicating between a browser element executing in a browser and an external application. In the following description, continuing reference is made to one or more elements shown in FIG. 1 and FIG. 2, and the same reference numerals used in association with these elements in FIG. 1 and FIG. 2 are also used in FIG. 3.

The web server 144 executes an external web application 302 that provides a web service 304. Either of the browser elements 110, 112 may access the web service 304 and thereby provide access from the web service 114 or the web service 122, respectively, to the external web application 302.

It is also noted that either the first browser element 110 or the second browser element 112 may also be configured as the web service 304.

In at least one implementation, the first browser element 110 is configured to subscribe to the web service 304. It is noted that the first browser element 110, the second browser element 112 or both may subscribe to the web service 304. By subscribing to the web service 304, the first browser element 110 will receive information from the web service 304 in the future without requesting the information from the web service 304.

For example, the first browser element 110 may be a map application that displays traffic incidents and the web service 304 may provide traffic incident data. The first browser element 110 can then receive traffic incident data without initiating a request for traffic incident data. It is noted that how often traffic incident data is sent to the first browser element 110 is configurable. The web service 304 may provide traffic incident data at regular intervals, when incidents occur or the like. For example, the first browser element 110 may be configured to have traffic incident data sent by the web service 304 as traffic incidents occur. Alternatively, the browser element may be configured to have the traffic incident data sent by the web service 304 in fifteen minute intervals.

It is noted that communication between the browser element 110 and the web service 304 is similar to the communication between the browser element 110 and the local web service 202.

Figure 4:
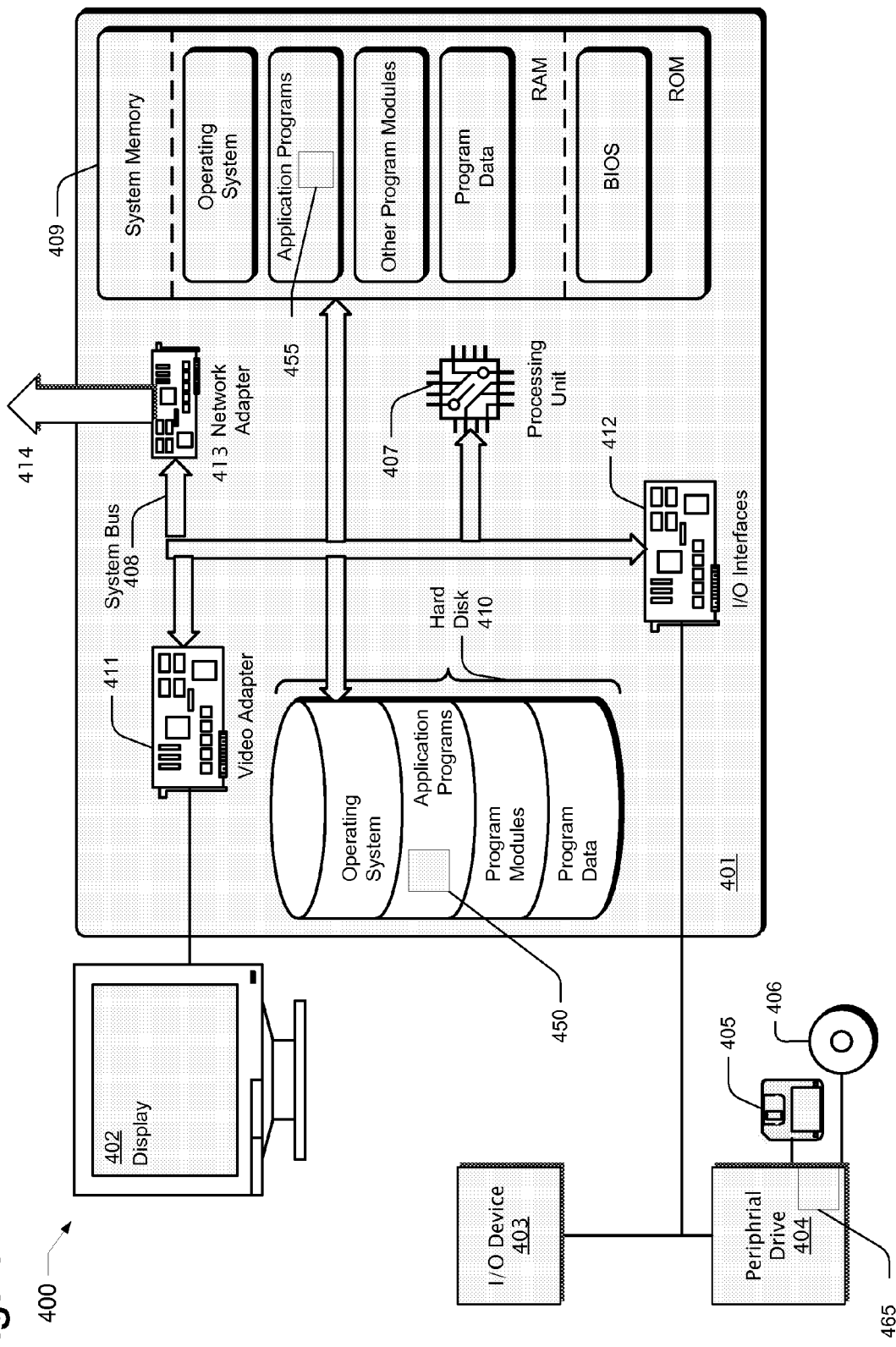
FIG. 4 illustrates an exemplary computing environment in which the various technologies described herein may be implemented.

FIG. 4 depicts an exemplary computing environment in which the various technologies described herein may be implemented. Exemplary computing environment 400 is only one example of a computing system and is not intended to limit the examples described in this application to this particular computing environment. The method for configuring a browser element to communicate with other browser elements and with external applications may be loaded onto a computing device 401 through the use of computer readable media 405, 406 or over a network 414. Once loaded onto the computing device 401 the method may reside as an application program 450 on an internal hard drive 410. When processing, the method may also exist as an application program 455 loaded into system memory 409.

The computing device 401 can be implemented with numerous other general purpose or special purpose computing system configurations. Examples of well known computing systems, may include, but are not limited to, personal computers, hand-held or laptop devices, microprocessor-based systems, multiprocessor systems, set top boxes, gaming consoles, consumer electronics, cellular telephones, PDAs, and the like.

Components of computing device 401 can include one or more processors (including CPUs, GPUs, microprocessors and the like) 407, a system memory 409, a system bus 408 that couples the various system components, and the method described above. Processor 407 processes various computer executable instructions, including those to execute and run the method for configuring a browser element to communicate with other browser elements and with external applications 450 to control the operation of computing device 401 and to communicate with other electronic and computing devices (not shown). The system bus 408 represents any number of several types of bus structures, including a memory bus or memory controller, a peripheral bus, an accelerated graphics port, and a processor or local bus using any of a variety of bus architectures.

The system memory 409 may include computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 407. The method for configuring a browser element to communicate with other browser elements and with external applications 455 may be stored in RAM and may be accessible to and/or presently operated on by one or more of the processors 407.

Mass storage devices 404 may be coupled to the computing device 401 or incorporated into the computing device by coupling to the buss. Such mass storage devices 404 may include a magnetic disk drive which reads from and writes to a removable, non-volatile magnetic disk (e.g., a "floppy disk") 405, or an optical disk drive that reads from and/or writes to a removable, non-volatile optical disk such as a CD-ROM or the like 406. Computer readable media such as 405, 406 typically embody computer readable instructions, data structures, program modules and the like supplied on floppy disks, CDs, portable memory sticks and the like. The method for configuring a browser element to communicate with other browser elements and with external applications 465 may be provided to the CPU 401 by the peripheral device 404.

The methods previously described may be disposed on these computer readable media.

Any number of program modules can be stored on the hard disk 410, Mass storage devices 404, ROM and/or RAM 409, including by way of example, an operating system, one or more application programs, other program modules, and program data. The method for configuring a browser element to communicate with other browser elements and with external applications 450 may be stored on the hard disk 410 or made available through a peripheral drive 404. Each of such operating system, application programs, other program modules and program data (or some combination thereof) may include an embodiment of the systems and methods described herein.

A display device 402 can be connected to the system bus 408 via an interface, such as a video adapter 411. The display device 402 displays the method for configuring a browser element to communicate with other browser elements and with external applications. A user can interface with computing device 402 via any number of different input devices 403 such as a keyboard, pointing device, joystick, game pad, serial port, and/or the like. These and other input devices are connected to the processors 407 via input/output interfaces 412 that are coupled to the system bus 408, but may be connected by other interface and bus structures, such as a parallel port, game port, and/or a universal serial bus (USB).

Computing device 401 can operate in a networked environment using connections to one or more remote computers through one or more local area networks (LANs), wide area networks (WANs) and the like. The computing device 401 is connected to a network 414 via a network adapter 413 or alternatively by a modem, DSL, ISDN interface or the like.

The storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). It is noted that by utilizing conventional techniques, all, or a portion of the software instructions may be carried out by a dedicated circuit, such as a DSP, programmable logic array, or the like.

What is claimed is:

1. A browser, comprising:
   a user interface having one or more browser elements, each browser element being configurable as a web service, wherein each browser element contains a communicator module configurable to communicate with one or more other browser elements and one or more external web services; and
   a web scripting module configurable to access each web service of each browser element.

2. The browser of claim 1, wherein each browser element is associated with a unique identifier.

3. The browser of claim 2, wherein the unique identifier is an internet protocol address.

4. The browser of claim 2, wherein the unique identifier is a uniform resource identifier.

5. The browser of claim 1, wherein each browser element contains a user interface component.

6. The browser of claim 5, wherein the user interface component is configurable to support different programming languages.

7. The browser of claim 6, wherein the user interface component is configurable to determine how each browser element is displayed in the user interface.

8. The browser of claim 1, wherein the web service includes one or more application programming interfaces.

9. The browser of claim 8, wherein the web scripting module is configurable to support different programming languages.

10. The browser of claim 9, wherein the web scripting module contains a web script.

11. The browser of claim 10, wherein the web script accesses the one or more application programming interface.

12. A method for communicating between one or more browser elements in a browser, comprising:
   executing a first browser element in the browser, the first browser element configurable as a first web service;
   executing a second browser element in the browser, the second browser element configurable as a second web service;
   associating the first browser element with a first unique identifier;
   associating the second browser element with a second identifier; and
   initiating communication between the first browser element and the second browser element, wherein the first element references the second unique identifier and sends a request message to the second browser element.

13. The method of claim 12, wherein the first web service includes one or more application programming interfaces.

14. The method of claim 13, wherein the browser includes a web scripting module.

15. The method of claim 14, wherein the web scripting module includes a web script.

16. The method of claim 15, wherein the web script accesses the one or more application programming interfaces.

17. The method of claim 12, wherein the browser includes a user interface.

18. The method of claim 17, wherein each browser element includes a user interface component configurable to determine how each browser element is displayed by the user interface.

19. A method for communicating between one or more browser elements in a browser, comprising:
   executing a first browser element in the browser, the first browser element configurable as a first web service, wherein the first browser element contains a first communicator module configurable to communicate with one or more other browser elements and one or more external web services;
   executing a second browser element in the browser, the second browser element configurable as a second web service, wherein the second browser element contains a second communicator module configurable to communicate with one or more browser elements and one or more external web services;
   configuring the first and second communicator module to support a same communication protocol;
   associating the first browser element with a first unique identifier;
   associating the second browser element with a second identifier; and
   initiating communication between the first browser element and the second browser element, wherein the first element references the second unique identifier and sends a request message to the second browser element.

20. The method of claim 19, wherein the same communication protocol is Transmission Control Protocol/Internet Protocol.

* * * * *